US011782576B2

(12) United States Patent
Harris et al.

(10) Patent No.: US 11,782,576 B2
(45) Date of Patent: Oct. 10, 2023

(54) CONFIGURATION OF USER INTERFACE FOR INTUITIVE SELECTION OF INSIGHT VISUALIZATIONS

(71) Applicant: Adobe Inc., San Jose, CA (US)

(72) Inventors: Camille Harris, Atlanta, GA (US); Zening Qu, Seattle, WA (US); Sana Lee, Brea, CA (US); Ryan Rossi, Santa Clara, CA (US); Fan Du, Milpitas, CA (US); Eunyee Koh, San Jose, CA (US); Tak Yeon Lee, Cupertino, CA (US); Sungchul Kim, San Jose, CA (US); Handong Zhao, San Jose, CA (US); Sumit Shekhar, Bangalor (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/161,770

(22) Filed: Jan. 29, 2021

(65) Prior Publication Data

US 2022/0244815 A1     Aug. 4, 2022

(51) Int. Cl.
*G06F 3/0482* (2013.01)
*G06F 17/15* (2006.01)
*G06F 3/04845* (2022.01)

(52) U.S. Cl.
CPC ........ *G06F 3/0482* (2013.01); *G06F 3/04845* (2013.01); *G06F 17/15* (2013.01)

(58) Field of Classification Search
CPC ..... G06F 3/0482; G06F 3/04845; G06F 17/15
See application file for complete search history.

(56) References Cited

U.S. PATENT DOCUMENTS

| 10,635,262 B2* | 4/2020 | Stewart | G06F 3/0482 |
| 2014/0282184 A1* | 9/2014 | Dewan | G06F 3/0481 |
| | | | 715/771 |
| 2016/0162588 A1* | 6/2016 | Tuchman | G06F 16/9535 |
| | | | 707/722 |

(Continued)

OTHER PUBLICATIONS

Agrawal et al., Fast Algorithms for Mining Association Rules, In Proceedings of the 20th International Conference on Very Large Data Bases, VLDB, vol. 1215, 1994, pp. 487-499.

(Continued)

*Primary Examiner* — Kyle R Stork
(74) *Attorney, Agent, or Firm* — Kilpatrick Townsend & Stockton LLP

(57) ABSTRACT

In some embodiments, a data visualization system detects insights from a dataset and computes insight scores for respective insights. The data visualization system further computes insight type scores, from the insight scores, for insight types in the detected insights. The data visualization system determines a selected insight type for the dataset having a higher insight type score than unselected insight types and determines, for the selected insight type, a set of selected insights that have higher insight scores than unselected insights. The data visualization system determines insight visualizations for the set of selected insights and generates, for inclusion in a user interface of the data visualization system, selectable interface elements configured for invoking an editing tool for updating the determined insight visualizations from the dataset. The selectable interface elements are arranged in the user interface according to the insight scores of the set of selected insights.

20 Claims, 7 Drawing Sheets

(56) References Cited

U.S. PATENT DOCUMENTS

2018/0088753 A1  3/2018  Viegas et al.
2021/0365471 A1* 11/2021  O'Hara ............... G06F 16/26

OTHER PUBLICATIONS

Amar et al., Low-Level Components of Analytic Activity in Information Visualization, In IEEE Symposium on Information Visualization, INFOVIS, IEEE, 2005, pp. 111-117.
Bouali et al., VizAssist: An Interactive User Assistant for Visual Data Mining, The Visual Computer, vol. 32, No. 11, 2016, pp. 1-23.
Casner, Task-Analytic Approach to the Automated Design of Graphic Presentations, ACM Transactions on Graphics, vol. 10, No. 2, Apr. 1991, pp. 111-151.
Chandola et al., Anomaly Detection: A Survey, ACM Computing Surveys (CSUR), vol. 41, No. 3, Article 15, Jul. 2009, pp. 1-58.
Chang et al., Defining Insight for Visual Analytics, IEEE Computer Graphics and Applications, vol. 29, No. 2, Mar.-Apr. 2009, pp. 14-17.
Cui et al., DataSite: Proactive Visual Data Exploration with Computation of Insight-Based Recommendations, Available Online at: CoRR, abs/1802.08621, Sep. 22, 2018, pp. 1-14.
Deardorff, Resource Reviews, Journal of the Medical Library Association: JMLA, vol. 104, No. 2, Apr. 2016, pp. 182-183.
Demiralp et al., Foresight: Recommending Visual Insights, Available Online at: arXiv:1707.03877, Jul. 12, 2017, pp. 1-4.
Dey et al., Email Analytics for Activity Management and Insight Discovery, In 2013 IEEE/WIC/ACM International Joint Conferences on Web Intelligence (WI) and Intelligent Agent Technologies (IAT), vol. 1, IEEE, 2013, pp. 557-564.
Dibia et al., Data2Vis: Automatic Generation of Data Visualizations Using Sequence-to-Sequence Recurrent Neural Networks, IEEE Computer Graphics and Applications, vol. 39, No. 5, 2019, pp. 1-10.
Ding et al., Quickinsights: Quick and Automatic Discovery of Insights from Multi-Dimensional Data, In Proceedings of the 2019 International Conference on Management of Data, 2019, pp. 317-332.
Domingos, A Few Useful Things to Know About Machine Learning, Communications of the ACM, vol. 55, No. 10, 2012, pp. 78-87.
Duggimpudi et al., Spatio-Temporal Outlier Detection Algorithms Based on Computing Behavioral Outlierness Factor, Data & Knowledge Engineering, vol. 122, 2019, pp. 1-32.
Duraj et al., Outlier Detection Using the Multiobjective Genetic Algorithm, Journal of Applied Computer Science, vol. 25, No. 2, 2017, pp. 29-42.
Few et al., Data Visualization Effectiveness Profile, Available Online at: https://www.perceptualedge.com/articles/visual_business_intelligence/data_visualization_effectiveness_profile.pdf, 2017, pp. 1-11.
Gao et al., Newsviews: An Automated Pipeline for Creating Custom Geovisualizations for News, In Proceedings of the SIGCHI Conference on Human Factors in Computing Systems, CHI '14, Association for Computing Machinery, 2014, pp. 3005-3014.
Gupta et al., Outlier Detection for Temporal Data: A Survey, IEEE Transactions on Knowledge and Data Engineering, vol. 26, No. 9, 2013, pp. 2250-2267.
He et al., Discovering Cluster-Based Local Outliers, Pattern Recognition Letters, vol. 24, Nos. 9-10, 2003, 13 pages.
Ho et al., Simple Explanation of the No-Free-Lunch Theorem and Its Implications, Journal of Optimization Theory and Applications, vol. 115, No. 3, 2002, p. 549.
Hu et al., VizML: A Machine Learning Approach to Visualization Recommendation, In Proceedings of the 2019 CHI Conference on Human Factors in Computing Systems, CHI '19, Association for Computing Machinery, May 4-9, 2019, pp. 1-12.
Joyce et al., A Review of No Free Lunch Theorems, and Their Implications for Metaheuristic Optimisation, In Nature-Inspired Algorithms and Applied Optimization, Springer, 2018, pp. 1-9.
Kassel et al., Online Learning of Visualization Preferences Through Dueling Bandits for Enhancing Visualization Recommendations, In EuroVis (Short Papers), 2019, pp. 85-89.
Leban et al., VizRank: Data Visualization Guided by Machine Learning, Data Mining and Knowledge Discovery, vol. 13, No. 2, 2006, pp. 119-136.
Lee et al., Task Taxonomy for Graph Visualization, In Proceedings of the 2006 AVI Workshop on beyond Time and Errors: Novel Evaluation Methods for Information Visualization, BELIV '06, Association for Computing Machinery, 2006, pp. 1-5.
Liu et al., Designing Discovery Experience for Big Data Interaction: A Case of Web-Based Knowledge Mining and Interactive Visualization Platform, In A. Marcus, editor, Design, User Experience, and Usability. Web, Mobile, and Product Design, 2013, pp. 543-552.
Liu et al., Unsupervised Detection of Contextual Anomaly in Remotely Sensed Data, Remote Sensing of Environment, vol. 202, 2017, pp. 1-40.
Luo et al., DeepEye: Towards Automatic Data Visualization, In 2018 IEEE 34th International Conference on Data Engineering (ICDE), IEEE, 2018, pp. 101-112.
Mackinlay et al., Show Me: Automatic Presentation for Visual Analysis, IEEE Transactions on Visualization and Computer Graphics, vol. 13, No. 6, 2007, pp. 1137-1144.
Moritz et al., Formalizing Visualization Design Knowledge as Constraints: Actionable and Extensible Models in Draco, IEEE Transactions on Visualization and Computer Graphics, vol. 25, No. 1, 2018, pp. 1-11.
Palshikar et al., Simple Algorithms for Peak Detection in Time-Series, Proceedings of the 1st International Conference on Advanced Data Analysis, Business Analytics and Intelligence, vol. 122, 2009, 13 pages.
Perry et al., VizDeck: Streamlining Exploratory Visual Analytics of Scientific Data, Available Online at: https://faculty.washington.edu/billhowe/publications/pdfs/perry2013vizdeck.pdf, Feb. 12-15, 2013, pp. 338-350.
Petajan et al., Dataspace: An Automated Visualization System for Large Databases, In Visual Data Exploration and Analysis IV, vol. 3017, International Society for Optics and Photonics, 1997, pp. 1-3.
Roth et al., Toward an Information Visualization Workspace: Combining Multiple Means of Expression, Human-Computer Interaction, vol. 12, Nos. 1 and 2, 1997, pp. 131-185.
Seo et al., A Rank-by-Feature Framework for Interactive Exploration of Multidimensional Data, Information Visualization, vol. 4, No. 2, 2005, pp. 96-113.
Siddiqui et al., Effortless Data Exploration with Zenvisage: An Expressive and Interactive Visual Analytics System, Available Online at: http://www.vldb.org/pvldb/vol10/p457-siddiqui.pdf, 2016, pp. 457-468.
Srinivasan et al., Augmenting Visualizations with Interactive Data Facts to Facilitate Interpretation and Communication, IEEE Transactions on Visualization and Computer Graphics, vol. 25, No. 1, 2019, pp. 672-681.
Vartak et al., SeeDB: Efficient Data-driven Visualization Recommendations to Support Visual Analytics, In Proceedings of the VLDB Endowment International Conference on Very Large Data Bases, vol. 8, NIH Public Access, 2015, pp. 2182-2193.
Vartak et al., Towards Visualization Recommendation Systems, SIGMOD Record, vol. 45, No. 4, Dec. 2016, pp. 34-39.
Wang et al., A Nonlinear Correlation Measure for Multivariable Data Set, Physica D: Nonlinear Phenomena, vol. 200, Nos. 3-4, 2005, pp. 1-2.
Wang et al., Bagging Nearest-Neighbor Prediction Independence Test: An Efficient Method for Nonlinear Dependence of Two Continuous Variables, Scientific Reports, vol. 7, No. 1, 2017, pp. 1-12.
Wang et al., Datashot: Automatic Generation of Fact Sheets from Tabular Data, IEEE Transactions on Visualization and Computer Graphics, vol. 26, No. 1, 2019, pp. 1-12.
Wang et al., Unbiased Multivariate Correlation Analysis, Proceedings of the Thirty-First AAAI Conference on Artificial Intelligence (AAAI-17), 2017, pp. 2754-2760.
Wills et al., AutoVis: Automatic Visualization, Information Visualization, vol. 9, No. 1, 2010, pp. 47-69.

(56) References Cited

OTHER PUBLICATIONS

Wolpert et al., No Free Lunch Theorems for Optimization, IEEE Transactions on Evolutionary Computation, vol. 1, No. 1, Apr. 1997, pp. 67-82.
Wolpert et al., No Free Lunch Theorems for Search, Technical Report, Technical Report SFI-TR-95-02-010, Feb. 23, 1996, pp. 1-38.
Wongsuphasawat et al., Voyager: Exploratory Analysis via Faceted Browsing of Visualization Recommendations, IEEE Transactions on Visualization and Computer Graphics, vol. 22, No. 1, 2015, pp. 649-658.
Wu et al., Scorpion: Explaining Away Outliers in Aggregate Queries, Available Online at: https://dl.acm.org/doi/pdf/10.14778/2536354.2536356, 2013, pp. 553-564.
Xiao, An Online Algorithm for Non-Parametric Correlations, Available Online at: arXiv preprint arXiv:1712.01521, Dec. 5, 2017, pp. 1-18.

* cited by examiner

| INSIGHT TYPE | ATTRIBUTE TYPE COMBINATIONS | INSIGHT DETECTION TOOLS |
|---|---|---|
| Timeseries Outliers | $N \times T$ | autocorrelation • IForest • one-class SVM |
| | $N \times N \times T$ | IForest • one-class SVM • LOF |
| | $C \times N \times T$ | temporal entropy • IForest • one-class SVM |
| Single Variable Outliers | $N$ | z-score • IQR • DBSCAN • LOF • one-class SVM |
| | $C$ | entropy |
| Two Variable Outliers | $N \times N$ | LOF • DBSCAN • k-means • IForest • one-class SVM |
| | $C \times C$ | PMI • ks-stat • IForest |
| Multivariate Outliers | $N \times \cdots \times N$ | CBLOF • k-means • IForest • one-class SVM |
| | $C \times N \times \cdots \times N$ | CBLOF • IForest |
| Timeseries Correlation | $N \times T$ | autocorrelation |
| Multivariate Timeseries Correlation | $C \times N \times T$ | temporal entropy |
| | $N \times N \times T$ | cross-correlation • cosine tdiff • Spearman tdiff |
| Two Variable Correlation | $N \times N$ | Pearson correlation • PCA • decision tree regression |
| | $N \times C$ | logistic regression • decision tree classification |
| | $C \times C$ | Theil's U • Cramer's V |
| Nonlinear Correlations | $N \times N$ | decision tree regression |
| | $C \times N$ | decision tree classification • logistic regression |
| | $C \times C$ | Theil's U • Cramer's V |
| Rank Correlation | $N \times N$ | Spearman • Kendall • Goodman-Kruskal's |
| Timeseries Causality | $N \times N$ | Granger causality |
| Stability | $N \times N$ | augmented Dickey-Fuller |
| Seasonality | $N$ | CH test |
| Spikes | $N$ | max local differences |
| Peaks | $N$ | k peaks of support |
| Irregularity | $N$ | augmented Dickey-Fuller |
| Skew | $C, N$ | unbiased skew |
| Heavy Tails | $C, N$ | kurtosis |

FIG. 3

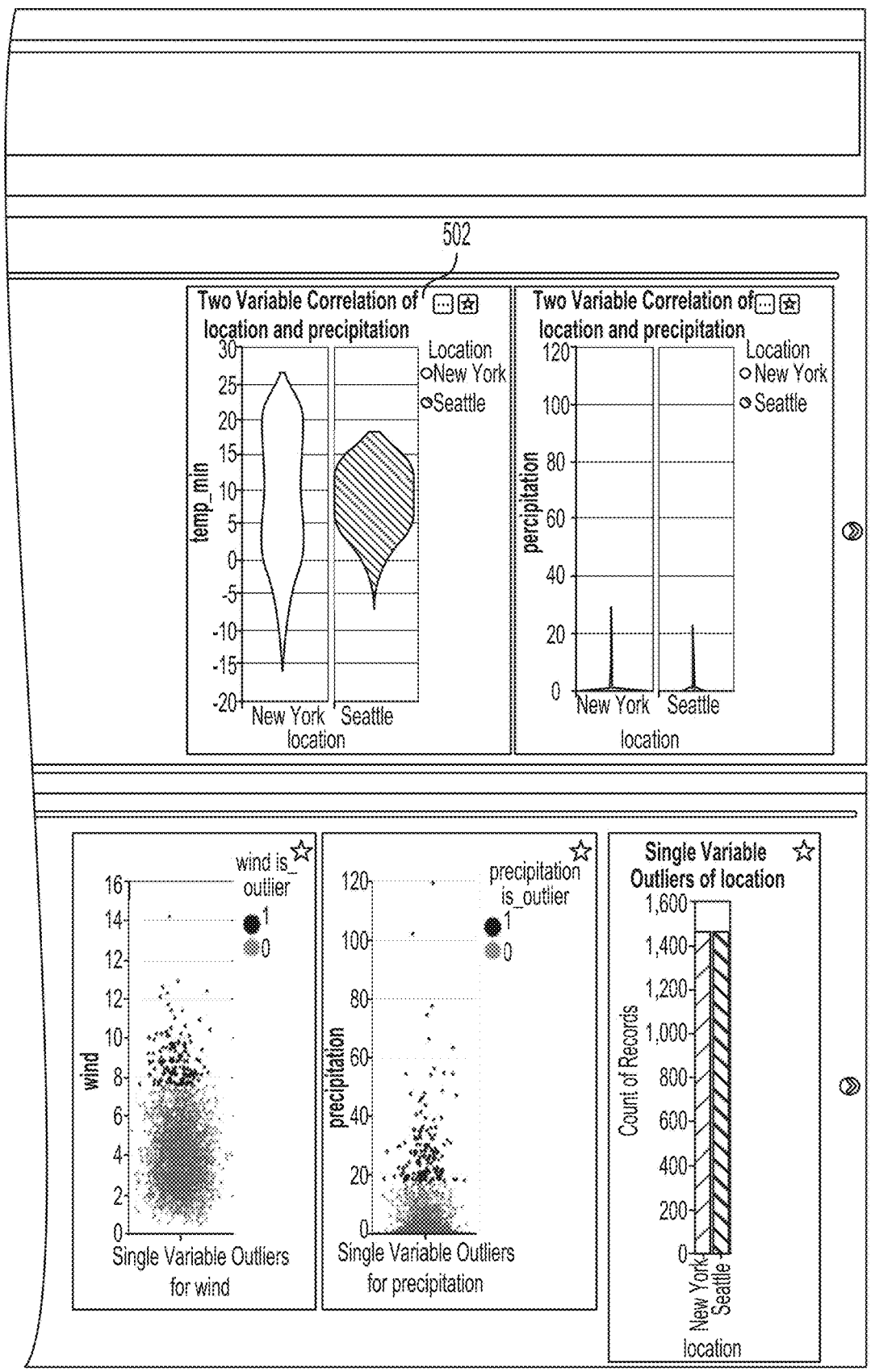
FIG. 5 (CONTIUED)

CONFIGURATION OF USER INTERFACE FOR INTUITIVE SELECTION OF INSIGHT VISUALIZATIONS

TECHNICAL FIELD

More specifically, but not by way of limitation, this disclosure relates to presenting proper visualization editing tools in a user interface based on detected various insights in a dataset and configuring graphical user interfaces for intuitive creation of insight visualization.

BACKGROUND

Content manipulation software, such as visualization software, provides a plethora of editing and presentation functions that are used to create or manipulate visually meaningful depictions of trends or other characteristics in, for example, large datasets that are automatically generated by online computing environments or other systems. Such software is often required to create visualizations of these datasets, since presenting a large amount of data in a meaningful way is typically impracticable without the aid of computerized tools. Visualization software provides this functionality to users by, for example, presenting users with different editing tools for automatically generating important and useful visualizations and for further manipulating or exploring these visualizations. However, existing visualization software merely output a single ordered list of visualization tools, regardless of whether a particular visualization tool or set of visualization tools would be more or less relevant to a particular dataset being used with the visualization software. These approaches make it difficult, time-consuming, and sometimes impossible for users to navigate to the most suitable content manipulation tools for a dataset of interest within visualization software.

SUMMARY

Certain embodiments involve the configuration of a user interface for intuitive selection of insight visualizations for a dataset. In one example, a data visualization system detects insights from a dataset that include data entries and variables of the data entries. An insight includes relationships among the variables or the data entries in the dataset. The detected insights have respective insight types, and each insight type contains a set of insights having common characteristics in the relationships in the dataset. The data visualization system computes insight type scores for the insight types from a combination of insight scores for the detected insights in the respective insight types. The data visualization system determines selected insight types for the dataset by selecting the insight types having the highest insight type scores and, for each selected insight type, the data visualization system further determines a set of selected insights that have the highest insight scores. The data visualization system selects the insight visualizations for the selected insights for displaying in a user interface of the data visualization system. The data visualization system also generates selectable interface elements, such as tools, for inclusion in the user interface of the data visualization system. These selectable interface elements are configured for invoking an editing tool for updating the determined insight visualizations from the dataset. These selectable interface elements are arranged in the user interface according to the insight scores of the set of selected insights.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts an example of a list of insight types, the associated attribute type combinations, and the associated insight detection tools, according to certain aspects of the present disclosure.

DETAILED DESCRIPTION

Figure 1:
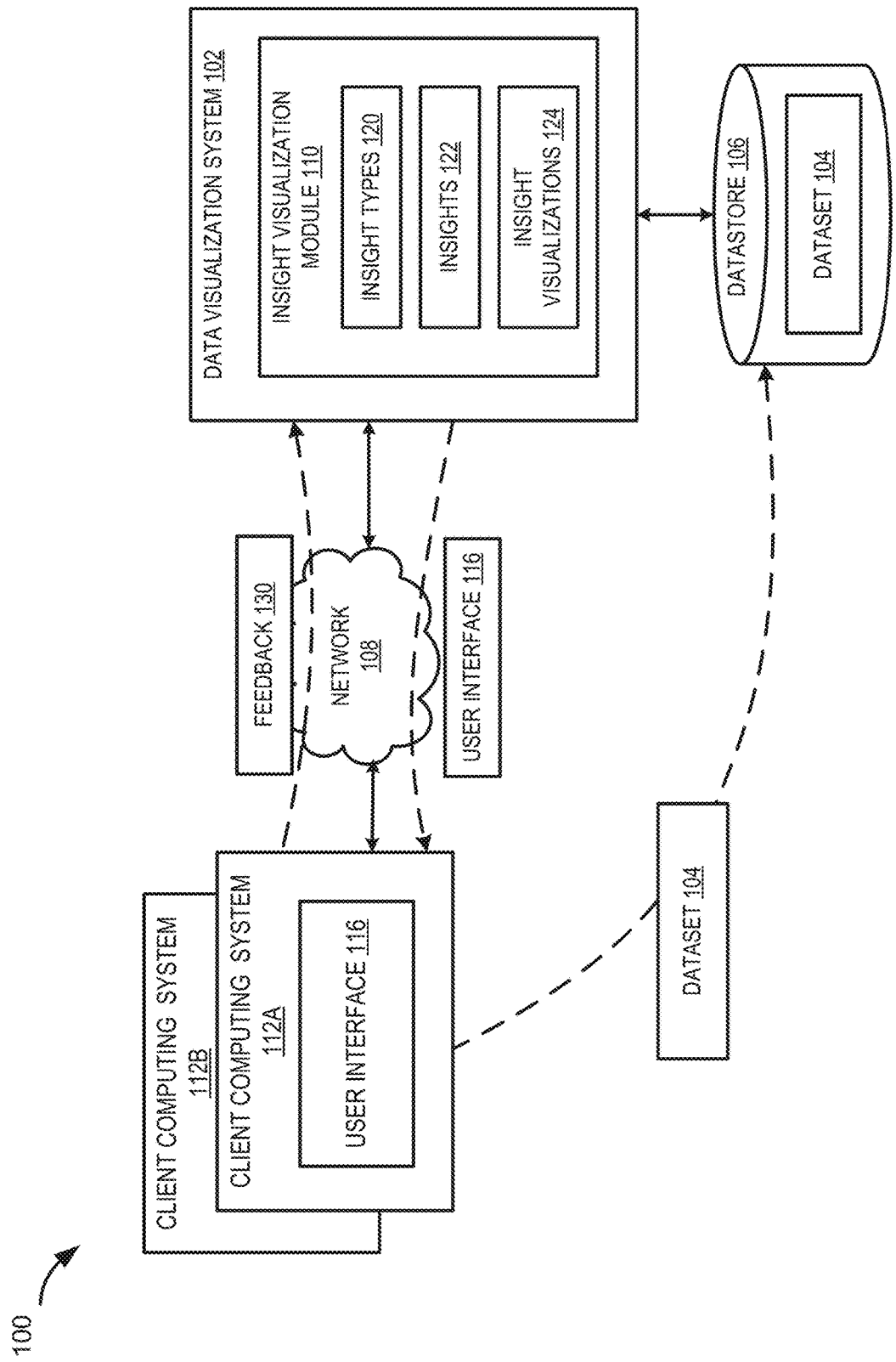
FIG. 1 is an example of a computing environment in which a data visualization system creates customized menus of editing tools for manipulating or otherwise exploring visualizations of insights that are more appropriate for that dataset, according to certain aspects of the present disclosure.

Certain embodiments involve the configuration of a user interface for intuitive selection of tools for creating, manipulating, or otherwise exploring insight visualizations for a dataset. For instance, data visualization software creates, based on a particular dataset, a customized menu of editing tools corresponding to different visualizations. To do so, the data visualization software evaluates the dataset to determine which insight types and associated insights are more relevant to a user or otherwise suitable for visualization. For each of the selected insights, the data visualization software further determines an insight visualization (e.g., a pie chart, a bar chart, or scattered points) suitable to display the data in the insight according to the data attributes involved in the corresponding insight. The visualization software builds a contextual menu or other suitable user interface that includes editing tools configured for manipulating the associated insight visualization within the visualization software. These embodiments therefore provide improved software functionality by automatically generating menus of editing tools that allow users to more efficiently or intuitively create or edit appropriate insight visualizations for a given dataset.

The following non-limiting example is provided to introduce certain embodiments. In this example, a data visualization system is configured to evaluate an input dataset to detect insights. The input data include multiple data entries and each data entry has multiple data attributes which include numerical data attributes, categorical data attributes, or both. An insight includes relationships among variables or the data entries in the dataset. Subsets of the detected insights have respective insight types and each insight type includes a set of insights having common characteristics in the relationships in the dataset. Each insight is associated with an attribute combination specifying the type of data attributes involved in detecting the corresponding insight. For a given insight of an insight type, one or more insight tools are available to detect the insight and to generate an insight score. The insight tools for an insight are determined according to the attribute combination associated with the insight.

For instance, for an insight type of two-variable outliers, insights can be detected from two numerical attributes or two categorical attributes. To detect insights for this insight type, the data visualization system selects a pair of data attributes and further selects an insight detection tool based on the types of the data attributes in the pair. An insight detection tool is an algorithm or a method for detecting certain types of insights in input data. For example, if the pair of data attributes are both numerical attributes, insight detection tools such as k-means or one-class SVM can be selected to detect two-variable outliers. The data visualization system repeats this process for other pairs of data attributes of the input data set. The insight detection tools can also be configured to output an insight score indicating the significance of the insight or a relationship strength for the variables or data entries in the data set. In the example of insight of two-variable outliers, the insight score indicates the degrees of the detected two-variables outliers.

Continuing this example, the data visualization system further generates an insight type score for each insight type by aggregating the insight scores of the insights in each insight type. Using the insight type scores, the data visualization system ranks the insight types and selects insight types having the highest insight type scores for visualization. For each selected insight type, the data visualization system ranks the insights according to their respective insight scores and selects the insights having the highest insight scores for visualization.

For each selected insight in each selected insight type, the data visualization system determines an insight visualization (e.g., a pie chart, a bar chart, or a scattered point plot) suitable for visualizing the data in insight. The insight visualization can be selected based on, for example, data contained in the insight, the attributes involved in the insight, the nature of the insight, or any combination thereof. The data visualization system further generates selectable interface elements for inclusion in a user interface of the data visualization system and these selectable interface elements are arranged in the user interface according to the insight scores of the set of selected insights. In this way, the insights or insight types having low insight scores or low insight type scores are not displayed in the user interface to minimize the distraction. In some examples, these selectable interface elements are configured for invoking an editing tool for updating the determined insight visualizations from the dataset. The user interface is further configured to allow a user to provide feedback to the data visualization system, such as marking his/her favorite insight visualizations. Such updates and feedback can then be taken into account when selecting the insights, the insight types, and the insight visualizations for future datasets to be presented for that user.

The technology presented herein improves the computer technology because it improves the ability of a user to use the computer to access useful data in an arbitrary database based on the data insights and lessening the burden of navigation of user interfaces. Conventional systems often present different types of editing tools without regard to which tools might be more useful for a given dataset. For instance, in order to use conventional visualization software, users must painstakingly traverse a single ordered list of numerous insight visualizations presented in the user interfaces to identify the appropriate editing tools for creating or manipulating useful and insightful visualizations. This process is time-consuming and difficult to learn, particularly to novice users.

By contrast, embodiments described herein improve the functionality of visualization software by dynamically generating menus of editing tools corresponding to more useful insights and useful insight types. For instance, visualization software described herein executes an algorithm that detects, for a given dataset, various insights in various insight types and determines the proper visualization formats for presenting the respective selected insights. The visualization software uses the results of this algorithm to configure a user interface with a menu presenting editing tools for insight visualizations in an organized way (e.g., with tools for the most important insights and insight types are presented first). Such a menu includes selectable interface elements for presenting and enabling editing of the determined insight visualization in the user interfaces of the data visualization system. Different selectable interface elements are generated for different insight visualizations so that proper editing tools are invoked for different insight visualizations. These selectable interface elements allow users to directly edit or otherwise manipulate the insights, the insight visualization, or the data associated therewith.

Configuring the user interface in this manner improves the functionality of the interface by, for example, providing the proper editing tools to a user thereby allowing a user to quickly create and adjust the insight visualizations for a dataset. Even novice users without much knowledge about the user interface and the underlying data in the dataset can quickly and accurately select the right editing tools to identify the important features or insights from the massive data in the dataset. These techniques, therefore, decrease the amount of time or effort involved with using visualization software to create insight visualizations from a dataset.

Referring now to the drawings, FIG. 1 is an example of a computing environment 100 in which a data visualization system 102 creates, based on analyzing an input dataset, customized menus of editing tools for manipulating visualizations of insights that are more appropriate for that dataset. In various embodiments, the computing environment 100 includes the data visualization system 102 and one or more client computing systems 112A-112B (which may be referred to herein individually as a client computing system 112 or collectively as the client computing systems 112).

A user may operate a client computing system 112 and submit a dataset 104 for visualization. In some examples, the dataset 104 includes multiple data entries and each data entry has multiple data attributes. The data attributes can be classified into different types, such as numerical data attributes (also referred to as "numerical attributes" in short), categorical data attributes (also referred to as "categorical attributes" in short), temporal data attributes (or "temporal attributes" in short) or other types of data attributes. The dataset 104 may be stored locally at the client computing system 112 or at a remote storage device accessible to the client computing system 112. In these examples, the client computing system 112 transmits the dataset 104 through a network 108 to the data visualization system 102 for analysis and visualization. The network 108 may be a LAN, a WAN, the Internet, or any other networking topology known in the art that connects the client computing system 112 to the data visualization system 102. The data visualization system 102 stores the dataset 104 in a data store 106. In other examples, the dataset 104 may be obtained through a third-party data service instead of the client computing system 112.

The data visualization system 102 employs an insight visualization module 110 to selects insights 122 and determine insight visualizations 124 for the selected insights from the dataset 104. An insight 122 of a dataset 104 indicates the underlying knowledge, characteristics, or information of the dataset 104. For example, an insight 122 includes the relationships among variables or the data entries in the dataset, such as a strong linear correlation between two variables in the dataset, or a set of data points that are anomalies with respect to time. An insight 122 can be a property in the data that is unexpected, complex, deep, and relevant. Similarly, an insight can be the findings, knowledge, and information gained from performing an analytical task. For example, if an outlier detection tool is applied to a dataset 104, then the insights are the outliers found using the outlier detection tool. An insight type 120 is the common characteristics of insights 122 learned for a specific analytical task. Multiple insights may have the same insight type. Examples of an insight type include, but are not limited to, two-variable outliers, time-series outliers, non-linear correlations, among others. In these examples, insights of two-variable outliers, such as outliers in pairs (month, temperature), belong to the insight type of two-variable outliers. Insights detected for time-series outliers belong to the insight type of time-series outliers.

For a given dataset 104, the insight visualization module 110 evaluates the dataset 104 for a set of insight types 120. For each insight type 120, the insight visualization module 110 selects proper data attribute combination and employs insight detection tools that are suitable for the selected data attribute combination. For example, for an insight type 120 of two-variable outliers, the insight visualization module 110 selects an attribute combination of two data attributes from the dataset 104. If the attribute combination includes two numerical attributes, the insight visualization module 110 applies insight detection tools that are applicable to two numerical attributes to detect insights of two variable attributes. If the selected attribute combination includes one numerical attribute and one categorical attribute, the insight visualization module 110 applies insight detection tools that are applicable to a pair of a numerical attribute and a categorical attribute to detect insights of two variable attributes. The insight visualization module 110 repeats this process for different data attributes and different attribute combinations.

In some implementations, the insight detection tool outputs an insight score for the detected insight to indicate the significance of the detected insight. The insight visualization module 110 utilizes the insight scores to select insights for visualization. For example, the insight visualization module 110 uses the insight scores for insights 122 in each insight type 120 to calculate an insight type score for the corresponding insight type. Using the insight type scores, the insight visualization module 110 ranks the insight types 120 and selects a subset of insight types 120 that have the highest insight type scores for visualization. Inside each of the selected insight types, insights are ranked according to their respective insight scores and the insight visualization module 110 selects the insights having the highest insight scores for visualization. As a result, insights falling in the insight types having the highest insight type scores and having high insight scores themselves are selected for visualization. In this way, the most significant insights are automatically selected for presentation and are ordered according to their significance or importance.

To further increase the accessibility of the insights, the insight visualization module 110 determines, for each insight, a proper insight visualization 124 based on the nature and other aspects of the insight to show the data involved in the insight. An insight visualization 124 is a graphical representation of data in an insight. Examples of an insight visualization 124 include a pie chart, a bar chart, a scattered point plot, and the like. For instance, if a selected insight is a two-variable outlier insight, the insight visualization module 110 can select a scatter chart as the insight visualization 124. In the scatter chart, the horizontal axis and the vertical axis represent the two attributes, respectively. If the selected insight is a single-variable outlier, the insight visualization module 110 can select a column chart as the insight visualization 124 to show the single variable outlier. Additional details regarding selecting the insights 122, insight types 120, and insight visualizations 124 are provided below with regard to FIGS. 2-4.

The data visualization system 102 can employ the insight visualization module 110 or another module to generate a user interface 116 to present the insight visualizations 124. In certain examples, the insight visualization 124 are organized in the user interface 116 as groups representing the selected insight types 120. The groups are ordered according to the insight type scores and within each group, the visualizations for the insights are ordered according to their insight scores. In further examples, the insight visualization module 110 also generates and includes in the user interface 116 a selectable interface element for each insight visualization 124. The selectable interface element is configured for invoking an editing tool for updating the respective insight visualization from the dataset 104. The data visualization system 102 is configured to send the user interface 116 to the client computing system 112 for display. In some implementations, the user interface 116 further includes other functionalities such as a feedback mechanism allowing a user to select their preferred insight visualizations, insights, or insight types. These types of information may be sent back to the data visualization system 102 as feedback 130 to improve the insight visualizations. Additional details regarding the user interface 116 and feedback 130 are provided below with regard to FIG. 5.

One or more computing devices are used to implement the data visualization system 102. For instance, the data visualization system 102 could include a single computing device, a group of servers or other computing devices arranged in a distributed computing architecture, etc. The client computing system 112 can be any suitable device that is capable of displaying the user interface 116. For non-limiting examples, a client computing system 112 may be a server computer, a desktop computer, a laptop computer, a smartphone, a tablet, a smart wearable, or other types of user device.

Figure 2:
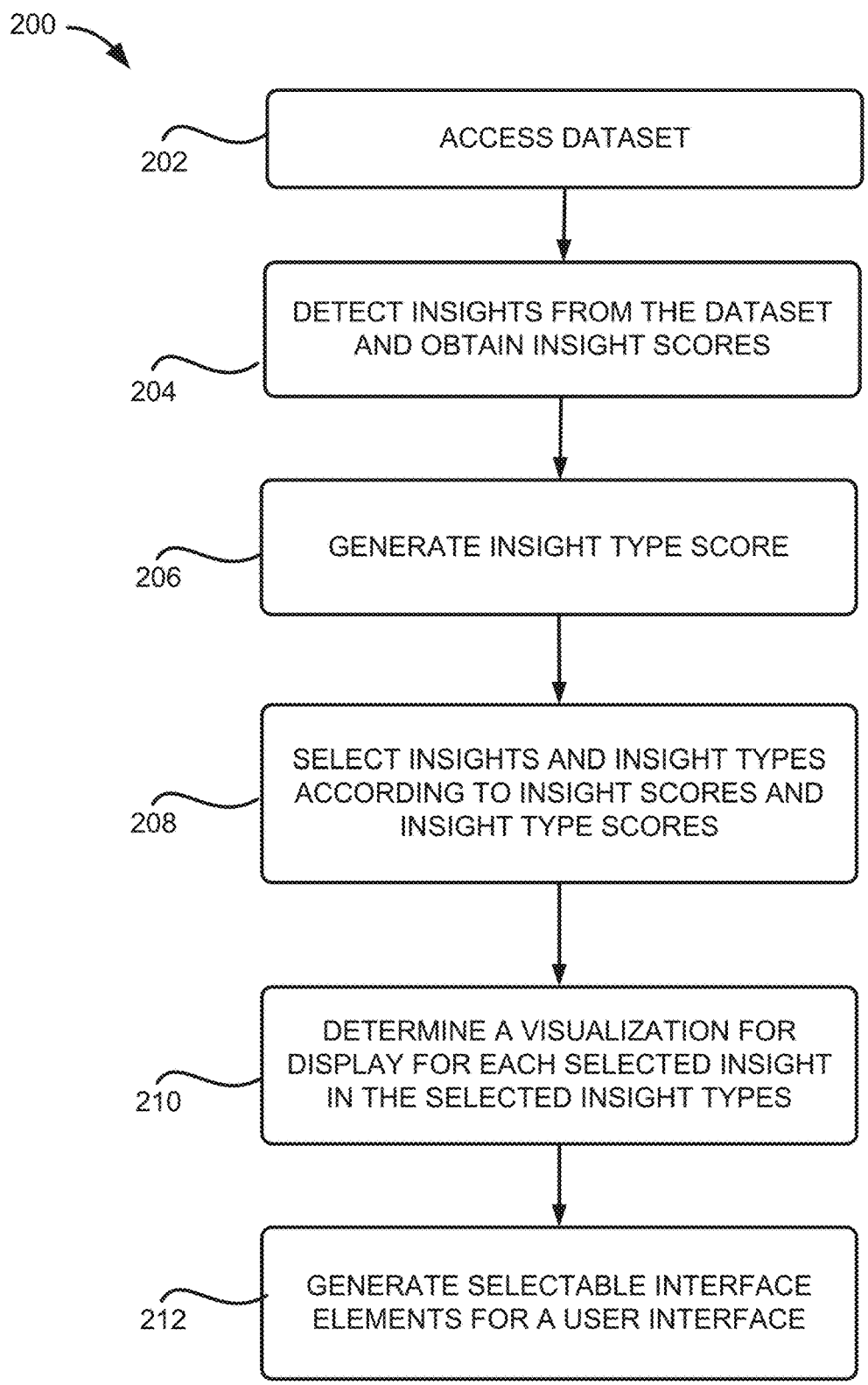
FIG. 2 depicts an example of a flowchart for creating a dataset-specific menu of editing tools for manipulating or otherwise exploring visualizations of insights from that dataset, according to certain aspects of the present disclosure.

FIG. 2 depicts an example of a process 200 for creating a dataset-specific menu of editing tools for manipulating or otherwise exploring visualizations of insights from that dataset in a user interface, according to certain aspects of the present disclosure. One or more computing devices (e.g., the data visualization system 102) implement operations depicted in FIG. 2 by executing suitable program code (e.g., the insight visualization module 110). For illustrative purposes, the process 200 is described with reference to certain examples depicted in the figures. Other implementations, however, are possible.

At block 202, the process 200 involves the data visualization system 102 accessing a dataset 104. The dataset can include any type of data that can be organized into data entries and each data entry has multiple data attributes. The data attributes can include numerical attributes, categorical attributes, temporal attributes, or others. In some examples, the dataset 104 can be formatted as a table with N rows representing the N data entries and M columns representing the M data attributes. The table is used as an example for illustration purposes, and should not be construed as limiting. Other data structures other than a table can also be used to represent the data in the dataset 104. The dataset 104 can include data collected in various applications, such as weather data, Internet data, computer activity log, sales data, agriculture data, manufacturing data, and others.

The client computing system 112 or another computing system sends the dataset 104 to the data visualization system 102 for analysis and visualization. The data visualization system 102 stores the dataset 104 in a suitable non-transitory computer-readable medium or other memory devices, such as the datastore 138 associated with the data visualization system 102. In some embodiments, the dataset 104 is stored on one or more non-transitory computer-readable media within the client computing system 112 or on a third-party system. The data visualization system 102 accesses the dataset 104 via suitable communications with the client computing system 112 or the third-party system.

At block 204, the process 200 involves the data visualization system 102 detecting insights 122 in the dataset 104 and generating insight scores for each detected insight 122. In some examples, the data visualization system 102 detects the insights 122 according to insight types. The data visualization system 102 accesses a list of insight types to be evaluated against the dataset 104. The list of insight types can be pre-determined or be selected by the data visualization system 102 based on the type of dataset 104. For instance, the data visualization system 102 stores a list of insight types 120 and evaluates the list of insight types 120 for any input dataset 104. In another example, the data visualization system 102 determines the list of insight types 120 depending on the type of data contained in the dataset 104. In this example, the list of insight types 120 evaluated for a dataset 104 containing weather data is different from the list of insight types 120 evaluated for a dataset 104 containing Internet data. As will be discussed later, the list of insight types 120 can also be customized for different users according to the feedback 130 provided by the respective users.

The data visualization system 102 accesses an insight type in the list of insight types and detect insights of this insight type using various insight detection tools. To detect an insight, the insight visualization module 110 selects proper data attributes and employs insight detection tools that are suitable for the selected data attributes based on the attribute type combination of the attributes. FIG. 3 shows an example of a list of insight types, the associated attribute type combinations, and the associated insight detection tools, according to certain aspects of the present disclosure. The list of insight types in this example includes 17 insight types. For each insight type, FIG. 3 also shows the insight detection tools that can be utilized to detect insights of that insight type. Because certain insight detection tools only work for certain attribute type combination, the insight detection tools are listed according to the applicable attribute type combinations. The data visualization system 102 selects the proper insight detection tools based on the types of data attributes used for detecting the insight.

For example, for an insight type 120 of two variable outliers, the data visualization system 102 selects an attribute combination of two data attributes from the dataset 104 and determines the attribute type combination of the selected attributes. If the selected attribute combination includes two numerical attributes, the corresponding attribute type combination is numerical and numerical (denoted as "N×N" in FIG. 3). The data visualization system 102 applies insight detection tools that are applicable to two numerical attributes to detect insights of two variable attributes. According to the example shown in FIG. 3, the data visualization system 102 can use insight detection tools such as local outlier factor (LOF), Density-based spatial clustering of applications with noise (DBSCAN), k-means, isolation forest (IForest), or one-class support vector machine (SVM) to detect insights from the two-attribute combination (e.g., the two columns of the dataset 104 corresponding to the selected two attributes). If the selected attribute combination includes two categorical attributes, the attribute type combination is categorical and categorical (denoted as "C×C" in FIG. 3). The data visualization system 102 can apply insight detection tools that are applicable to two categorical attributes to detect two-variable outliers of two variable attributes. According to the example shown in FIG. 3, the data visualization system 102 can use insight detection tools such as pointwise mutual information (PMI), Kolmogorov-Smirnov statistics (ks-stat), or IForest to detect insights from the two categorical attributes. In some implementations, the data visualization system 102 applies all or a portion of the applicable insight detection tools to the selected two-attribute combination. The insight visualization module 110 repeats this process for different data attribute combinations. For instance, if the dataset 104 includes M data attributes, there are $C_M^2$ different combinations of two attributes. The data visualization system 102 applies the above process for all or a subset of the $C_M^2$ combinations of two attributes.

Given an arbitrary dataset, each insight type (and attribute combination) has many potential insight detection tools and the best detection tool depends on the dataset itself and its characteristics. Using multiple insight detection tools for each insight type and attribute combination increases the likelihood of finding important insights, regardless of the input dataset and its underlying characteristics. Hence, the insight visualization disclosed herein can perform effectively for any input dataset, as opposed to a very small set of possible datasets handled in the prior art.

Considering that there are far fewer methods for discovering insights with categorical attributes, in some implementations, the data visualization system 102 converts a categorical attribute to a numerical attribute so that the vast majority of insight detection tools for numerical attributes can be used directly. For example, given a categorical variable, the data visualization system 102 counts the number of data points in each category to obtain a vector of counts. For instance, if the categorical variable is a variable indicating the city, the data visualization system 102 counts how many rows that match "City=Atlanta." The data visualization system 102 also derives a probability distribution from the counts. For example, given a categorical and numerical attribute combination, for each unique value of the categorical variable, the data visualization system 102 sums (or averages) all the rows of the numerical variable that match the categorical value. Given an attribute combination of two categorical attributes, the data visualization system 102 counts how many categorical value pairs (e.g., City=Atlanta, Gender=Female) appear in the data. The result is a vector of counts where each row corresponds to the count of a given pair of categorical values (one from either categorical variable). After the categorical attributes are converted to numerical attributes, insight detection tools for numerical variables are applicable to detect insights for categorical attributes.

Similarly, in some examples, the data visualization system 102 also transforms a categorical time-series attribute to a numerical time-series attribute to directly use the insight detection tools for numerical attributes. In these examples, given a categorical, numerical, and temporal attribute combination (C×N×T), for each unique value of the categorical variable that occurs during every temporal-value (e.g., 1 day, 1 week), the data visualization system 102 sums (or averages) all the rows of the numerical attributes that match the categorical value while satisfying that temporal-value as well.

Given a dataset with at least one attribute pertaining to time (e.g., whether it is the precise timestamp that an event or interaction occurred or simply the date), the technology presented herein automatically discovers time-series insights including time-series outliers, correlations, or time-series patterns such as peaks, spikes, irregularity, among others. This is performed by ordering all the attributes by the temporal attribute containing the timestamp. In this way, every attribute in the data is a valid time-series and can be either a categorical or numerical valued time-series. In addition to leveraging the time-series data at the temporal granularity given as input, the data visualization system 102 also automatically aggregates the data points using a variety of other temporal granularities including 1 hour, 1 day, 1 week, 1 month, 1 year, etc. When aggregating the data entry at each temporal granularity, the data visualization system 102 sums or counts all data points that occur within each discrete period of time. For example, suppose the temporal granularity of an hour is used, then the data visualization system 102 sums all the data points of an attribute that lie in each hour. The data visualization system 102 applies the various insight detection tools to the aggregated data entries to detect insights. In this way, insights at different temporal granularities are detected.

To generate the insight scores, each of the insight detection tools is configured to output an insight score for the detected insight indicating the significance of the detected insight or the relationship strength for the variables or data entries in the dataset. In some implementations, the insight score includes a score vector having the same size as the number of data entries N. In other words, the insight detection tool outputs a score for each data entry to indicate the relationship strength or the confidence of the attributes in that data entry having the corresponding feature. Using two-variable outliers as an example, the insight detection tool is configured to output a score for each of the N data entries to indicate the confidence of the two attributes in that data entry being an outlier. The insight scores output by different insight detection tools are aggregated to generate the insight score for an insight detected from the particular data attribute combination.

Determining the insight score as described above is formulated as follows. Given an insight type $I \in \Psi$, denote a set of insight detection tools for that insight type as $F_I$. The set of insight detection tools $F_I$ also includes insight detection tools with different hyperparameters. Denoting $p_I = |F_I|$, and assuming each insight detection tool outputs an insight score, there are $p_I$ scores for every insight detected for insight type $I \in C$. Define the utility function $\phi$ as:

$$\phi : X \times F_I \to R \qquad (1)$$

where X is the space of attribute combinations considered by the insight detection tools $F_I$ for insight type $I \in C$. The final insight score for an insight is defined as follows:

$$\phi(X_k, F_I) = \frac{1}{Z} \sum_{f_i \in F_I} \sum_{j=1}^{n} [g(f_i(X_k, \Lambda_i))]_j \qquad (2)$$

where $Z = |F_I| n$ and $X_k$ is an attribute matrix consisting of one or more attributes from $X \in R^{n \times m}$ In other words, $X_k$ is an attribute combination that may consist of one, two, or more attributes. Further, $[g(f_i(X_k, \Lambda_i))]_j$ is the jth value from $s = g(f_i(X_k)) \in R^n$ and $g: R \to [0, 1]$ and $\Lambda_i$ are the set of hyperparameters for the insight detection tool $f_i \in F_I$. For instance, suppose $f_i \in F_I$ is one-class SVM, then $\Lambda_i$ may include the kernel function K such as the non-linear radial basis function (RBF) kernel or polynomial kernel along with other hyperparameters including $\gamma$ or the degree of the polynomial kernel. In other words, if an insight detection tool can have multiple hyperparameter values, such as one-class SVM can have different kernels, the insight detection tool with different hyperparameter values are considered as different insight detection tools $f_i$.

The formulation in Eqn. (2) assumes that the output of each insight detection tool is the same. However, in general, some insight detection tools may return scores for only the most relevant data points (as opposed to all n data points), or even a single score for the attribute combination. In this case, Eqn. (2) can be rewritten as follows:

$$\phi(X_k, F_I) = \frac{1}{|F_I|} \sum_{f_i \in F_I} \frac{1}{n_i} \sum_{j=1}^{n_i} [g(f_i(X_k, \Lambda_i))]_j \qquad (3)$$

where $n_i$ denotes the number of scores returned by $f_i$.

Eqn. (2) or (3) assigns an insight score to the attribute combination $X_k$ for insight type $I \in C$ using the insight detection tools $F_I$. Using these insight scores, a ranking of the insights within the insight type $I \in C$ can be obtained as follows:

$$\rho(\{X_1, \ldots, X_k, \ldots\}) = \underset{k}{\arg\mathrm{sort}} \phi(X_k, F_I) \qquad (4)$$

In another example, instead of using the normalized scores from every insight detection tool to derive an insight score for an insight (i.e., a given insight type and an attribute combination), the insight score for each data point (row of $X_k$) is derived based on the rankings given by each insight detection tool. Using the ranks as opposed to the scores can potentially avoid biases given to certain insight detection tools depending on the distribution of inferred scores by the insight detection tools. For data entry j and attribute combination $X_k$, the data visualization system 102 generates a rank-based score as follows:

$$R_j(X_k, F_l) = \frac{1}{|F_l|} \sum_{f_i \in F_l} \pi_j(f_i(X_k, \Lambda_i)) \quad (5)$$

where $\pi_j(f_i(X_k, \Lambda_i))$ is the position of the jth data entry in the ranking obtained from attribute combination $X_k$ with insight detection tool $f_i \in F_l$. The ranking can be obtained, for example, by ranking data entries (rows) in $X_k$ according to the scores assigned to each data entry by the insight detection tool $f_i \in F_l$. Therefore, $R_j(X_k, F_l)$ is the average rank of jth data entry across all insight detection tools applied to $X_k$. In this way, every insight detection tool can be seen as having equal weight. Notice that Eqn. (5) gives an overall ranking for each data point j (row in X) whereas Eqn. (4) provides a ranking of the overall attribute combinations $\{X_1, \ldots, X_k, \ldots\}$ across all n data points and $|F_l|$ methods.

In some examples, the rank-based scores given by Eqn. (5) are used to appropriately annotate the visualizations for better visual insight recommendation. As an example, suppose the data visualization system 102 uses the set of insight detection tools for two-variable outliers and use these tools as an ensemble to obtain an overall ranking of the data points by how much of an outlier each data entry appears. This can be accomplished using the average rank of the data points given by the set of insight detection tools obtained through Eqn. (5).

Note that if g is set to the min-max norm for each insight type and attribute type combination, then by definition there is a diverse ranking of visualizations for each insight-type. Intuitively, since the min-max norm is applied to each attribute type combination independently, then one of the visual insights with that attribute type combination is guaranteed to score 1. Hence, if there are three attribute type combinations for a given insight-type, then the first three visual insights will be of different attribute type combinations.

In some examples, to ensure the approach is space-efficient and scalable for large datasets with millions or more data points, the data visualization system 102 does not store the scores of each data point (for all insight detection tools). Instead, the data visualization system 102 computes the final score on-the-fly while taking a scan over the (sampled) attribute values. For large data where even a linear scan over the data points is considered too computationally expensive, sampling or sketching techniques are used.

At block 206, the process 200 involves the data visualization system 102 generating the insight type score for the current insight type based on the insight scores. The insight types are scored in a data-driven fashion. In particular, the ranking of the different insight types is driven by the amount of information captured by each insight type across all the insight detection tools used for discovering insights of that insight type. Let $Q_I = \{X_1, \ldots X_k, \ldots\}$ denote the set of potential insights being scored for insight type $I \in C$, then $$\Psi(I) = \frac{1}{|Q_I|} \sum_{X_k \in Q_I} \phi(X_k, F_I) \quad (6)$$

where $\Psi(I)$ is the insight type score assigned to insight type $I \in C$ for the dataset 104. From Eqn. (6), if an insight type $I \in C$ receives a relatively high score $\Psi(I)$, then there are many important and highly scored insights of that insight type. Furthermore, the insight type score is derived using the insights discovered in the specific dataset 104 and the insight scores of those insights derived previously in block 206.

The operations in blocks 204 and 206 are repeated for each insight type involved in the process. At block 208, the process 200 involves the data visualization system 102 selecting insights and insight types for visualization according to the insight scores and insight type scores. In some examples, the data visualization system 102 ranks the insight types C and select the insight types according to the ranking. The ranking can be formulated as follows:

$$\rho_C(\{I_1, I_2, \ldots, I_{|C|}\}) = \underset{I \in C}{\arg sort}\, \Psi(I) \quad (7)$$

where for any two insight types $I_i$ and $I_j$ in the insight-type ranking $\rho_C(\{I_1, I_2, \ldots, I_{|c|}\})$ such that i<j, then $\Psi(I_i) \geq \Psi(I_j)$ holds by definition. This indicates that there are more important and useful insights of insight type $I_i$ in this specific dataset relative to the other insight-type $I_j$. Hence, the insights of insight-type $I_i$ should be displayed before the insights of insight type $I_j$. In other words, the user interface 116 is configured to display the insight types according to the ranking from Eqn. (7). This enables the user to quickly find the most important and relevant insights for the dataset 104. Furthermore, the insight type ranking for a given dataset in itself can be used to better understand the data quickly. For example, if the topmost important insight types for a specific dataset are all related to time-series (such as time-series outliers, time-series causality, and so on), then the user immediately knows that the temporal dimension in the data is important.

Similarly, for a given insight type $I \in C$, the higher the insight score of an insight is, the more important the information contained in that insight is. For any two insights $X_{k_i}$ and $X_{k_j}$ in the insight ranking $\rho(\{X_1, \ldots, X_k, \ldots\})$ such that i<j, then $\phi(X_{k_i}, F_I) \geq \phi(X_{k_j}, F_I)$ holds by definition. Hence, insight $X_{k_i}$ should be displayed before insight $X_{k_j}$. As such, the data visualization system 102 configures the insights within an insight type to be displayed according to the ranking given by Eqn. (4).

In some implementations, to limit the insights displayed in the user interface 116, the insight types having the highest R insight type scores are selected for display. That is, the first R insight types in the ranking given by Eqn. (7) are selected for display. For each selected insight type, the insights having the highest K insight scores are selected for display. That is, the first K insights in the ranking given by Eqn. (4) are selected for display. In some examples, one or more operations described herein with respect to blocks 204-208, including the examples described below with respect to FIGS. 3 and 4, can be used to implement a step for detecting a set of insights for visualization from the dataset.

At block 210, the process 200 involves the data visualization system 102 determining an insight visualization (e.g., a pie chart, a bar chart, or scattered points) for each selected insights to display the data of the respective selected insights. In some implementations, the data visualization system 102 selects the insight visualization for each insight using rule-based methods, such as CompassQL, from a list of candidate insight visualizations. The rule-based visualization recommendation methods determine a proper visualization or a list of proper visualizations for an insight based on factors, such as the types or classifications of attributes involved in the insight, the data contained in the insight, the nature of the insight, or any combination thereof.

For instance, if a selected insight is two variable outliers, the data visualization system 102 provides the two attributes involved in this insight to the ruled-based method, and among the output list of visualizations selects a scatter chart as the insight visualization 124. In the scatter chart, the horizontal axis and the vertical axis represent the two attributes, respectively. If the selected insight is a single-variable outlier, the insight visualization module 110 can select a column chart as the insight visualization 124 to show the single variable outlier. In some examples, one or more operations described herein with respect to block 210, including the examples described below with respect to FIGS. 3 and 4, can be used to implement a step for determining insight visualizations for the set of insights.

At block 212, the process 200 involves the data visualization system 102 generating selectable interface elements for a user interface configured for presenting the insight visualizations 124. The selectable interface element is configured for invoking an editing tool for updating the respective insight visualization from the dataset 104. In certain examples, the insight visualization 124 are organized in the user interface 116 as groups representing the selected insight types 120. The groups are ordered according to the insight type scores and within each group, the visualizations for the insights are ordered according to their insight scores. In further examples, the selectable interface elements for the insight visualizations 124 are associated with respective insight visualizations and are thus arranged in the user interface according to the insight scores of the selected insights.

Figure 4:
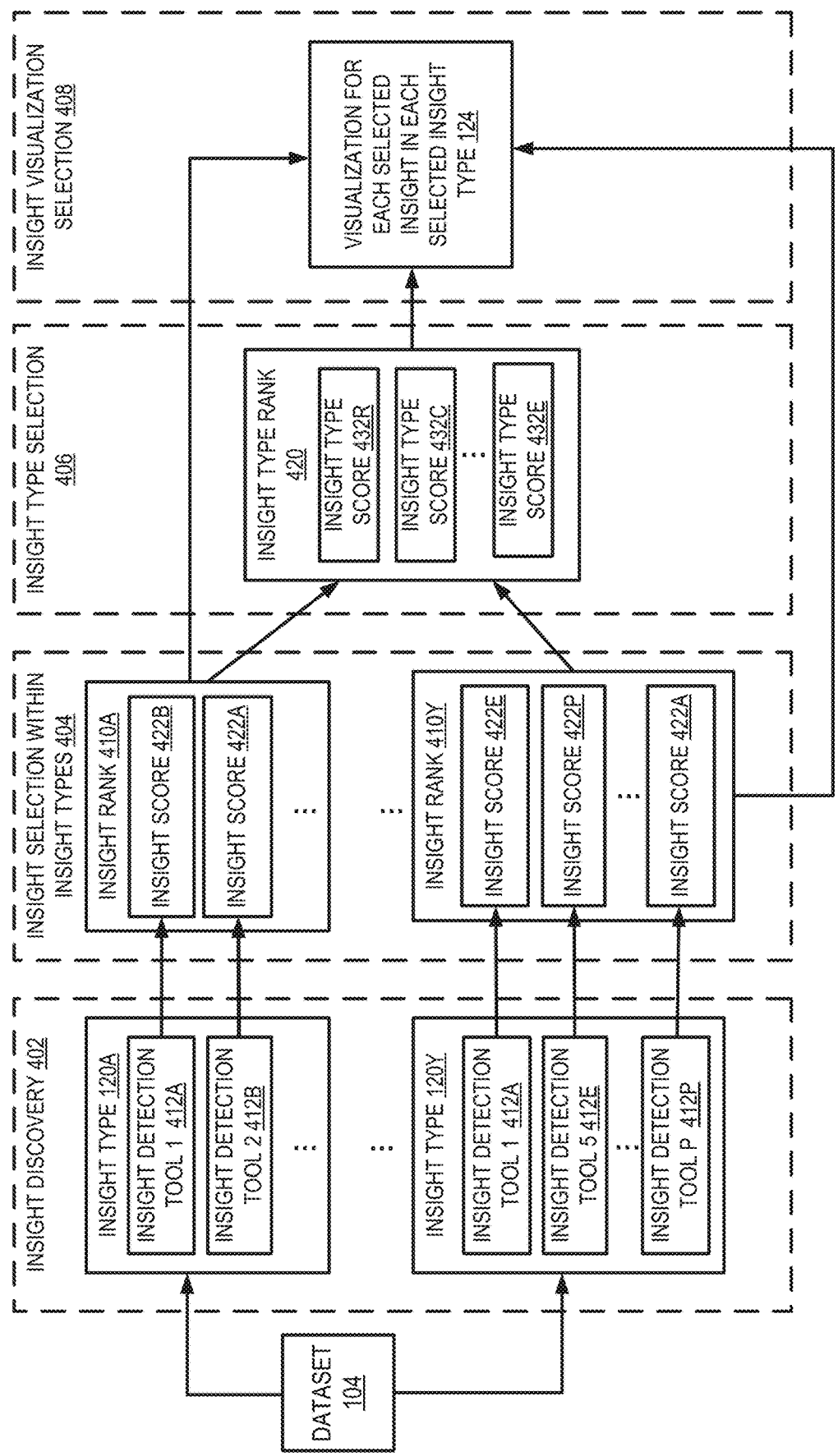
FIG. 4 depicts an example of a process for configuring, based on determinations of insights and insight types, user interfaces to include selectable elements that activates tools for manipulating or otherwise exploring insight visualizations, according to certain aspects of the present disclosure.

FIG. 4 summarizes the process for configuring, based on determinations of insights and insight types, user interfaces to include selectable elements that activates tools for manipulating or otherwise exploring insight visualizations as described above in terms of the different stages of the process. At the insight discovery stage 402, the data visualization system 102 evaluates the input dataset 104 using different insight detection tools 412A-412P (which may be referred to herein individually as an insight detection tool 412 or collectively as the insight detection tools 412) according to the insight types. Example insight detection tools for different insight types and attribute type combinations are shown in FIG. 3. In some examples, the same type of insight detection tool (such as one-pass SVM) with different hyperparameter values are treated as different insight detection tools at this stage. Applicable insight detection tools 412 are applied to different attribute combinations to generate insight scores 422 for these insights 122. At the insight selection stage 404, the data visualization system 102 ranks the insights within each insight type according to their respective insight scores 422 to generate insight ranks 410A-410Y for the insight types 120A-120Y. The data visualization system 102 further uses the insight ranks to select top-ranked insights for visualization.

At the insight type selection stage 406, the data visualization system 102 derives the insight type scores by aggregating the insight scores of the insights in the respective insight types. The data visualization system 102 further ranks the insight type scores to generate the insight type rank 420. Top-ranked insight types are selected using the insight type rank 420 for visualization. At the insight visualization selection stage 408, the data visualization system 102 determines proper visualization for each selected insight in each selected insight type using, for example, the rule-based visualization method.

Figure 5:
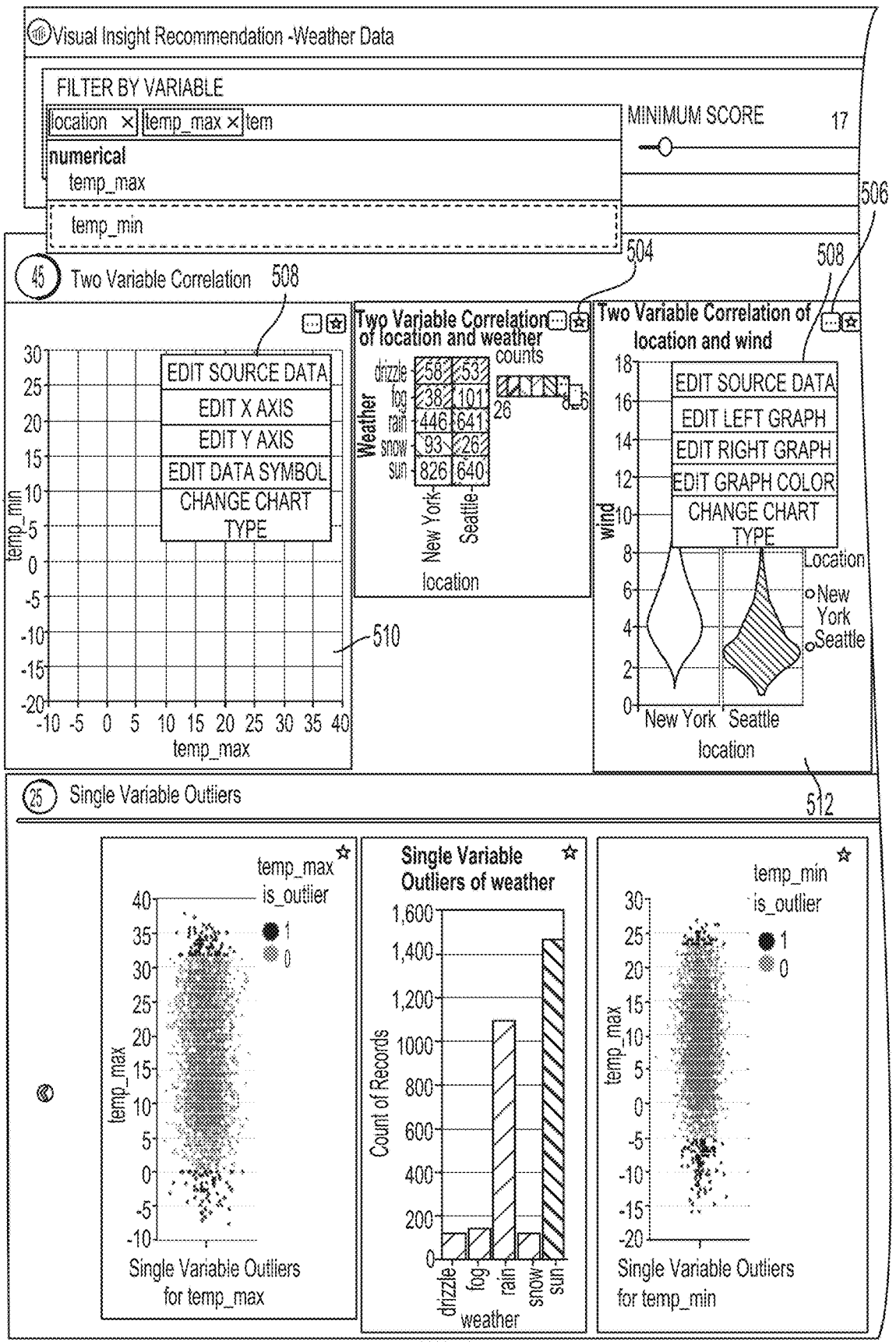
FIG. 5 depicts an example of a configurable graphical user interface for manipulating or otherwise exploring insight visualizations for a dataset, according to certain aspects of the present disclosure.

After determining the insight visualizations 124 for the selected insights 122, the data visualization system 102 or another computing system generates the user interface 116 to display these insight visualizations 124. FIG. 5 depicts an example of a graphical user interface 116 for manipulating or otherwise exploring the insight visualizations 124 for the selected insights 122 organized according to their respective insight types 120, according to certain aspects of the present disclosure. The insight visualizations are generated for a dataset 104 containing weather data. In the example shown in FIG. 5, each row represents one insight type and insight types having higher insight type scores are shown before those having lower insight type scores. The insight type scores for the insight types are also displayed (e.g., 45 for insight type "Two Variable Correlation" and 25 for insight type "Single Variable Outliers"). Within each row, one plot or chart represents one insight, and insights having higher insight scores are displayed before insights having lower insight scores.

As can be seen from FIG. 5, insights are shown in different insight visualizations 502 due to the data contained in the different insights. For example, for the insight type "Two Variable Correlation," the first insight (correlation between the maximum temperature and minimum temperature) is shown using a two-variable scattered plot because the two attributes are both numerical, and the second insight (the correlation between the location and weather) is shown using a stacked column chart because both attributes are categorical. Depending on the type of the insights, some insight visualizations are annotated to provide better visualization. For example, in the "Single Variable Outliers" insight type, data entries with high scores (indicating high significance as outliers) are annotated in their respective insight visualizations with different marks. The annotations can also be made using different colors, patterns, or the like.

In examples, the insight visualization 502 is presented with a selectable interface element which, when selected or otherwise activated, invokes an editing tool (e.g., shown in a separate window) for updating the determined insight visualizations from the dataset. The updates can include editing the underlying data shown in the insight visualization, changing the insight visualization type, changing the parameters of the insight visualization (e.g., the display range, the color, the granularity, etc.), and the like. For example, the selectable interface element is configured to allow a user to filter or remove specific data points by brushing over the data points on the charts and then pressing delete. The selectable interface element also allows users to manually modify or add annotations by drawing lines, brushing over a set of points in a scatter plot to change their color (or symbol, opacity, etc), or add text. In the example shown in FIG. 3, the selectable interface element is presented by way of an icon 506 and the associated context menu 508 displayed when the icon 506 is activated. The context menu 508 is generated according to the type of the visualization and thus is different for different visualizations. For instance, for the two-variable scatter chart 508, the context menu 508 is generated to include menu items invoking tools usable to edit the scatter chart 508, such as tools to edit the horizontal and vertical axis of the scatter chart, the symbols representing the data in the chart, etc. For the distribution chart 512, on the other hand, the context menu 508 instead includes items for invoking editing tools for the individual graph and the graph colors.

The example user interface 116 shown in FIG. 5 also provides a mechanism allowing users to mark their preferences which can be used as feedback to the data visualization system 102. In this example, each insight visualizations 124 is displayed with a star control 504. A user can mark favorite insight visualizations by clicking on the corresponding star control 504 to indicate that this insight visualization is important. This can be interpreted as the user prefers the insight type associated with the marked insight visualization, the insight displayed through the marked insight visualization, or this particular type of insight visualization. In some examples, this information and any other changes or operations performed by the user in the user interface are included in the feedback 130 sent to the data visualization system 102 to customize future user interface 116 for this user.

Other ways of obtaining user input can be implemented in the user interface 116 to gather feedback information 130. For example, the user interface shown in FIG. 5 allows a user to filter the results using attributes or variables. The user interface may also be configured to allow a user to submit a user-defined query to search the insights. In those examples, the filtering attributes or user-defined queries are also included in the feedback 130 to the data visualization system 102. In examples, the filters are further applied to insight type, score threshold, or insight visualization type. The results can be filtered by either inclusion or exclusion criteria, or by combining filters to create a custom search query. The user interface can be further configured to allow specific values for an attribute to be specified, thereby specifying a subset of the dataset on which the process described herein will be applied. For example, users might operate the user interface to show insights related to a specific attribute value, such as "location=New York."

Using the information contained in the feedback 130, the data visualization system 102 customizes the insight visualization generation for the user. For example, the insight scores calculated using Eqn. (2) or Eqn. (3) are scaled up to for the insights containing the attributes that are of the user's interest or are marked by the user as important to provide more weights to those attributes. Additionally, or alternatively, the data visualization system 102 also modifies the calculation of the insight type score shown in Eqn. (6) to assign a higher weight to the preferred insights than other insights. A higher weight is also assigned to those insight visualizations that are marked as important so that similar types of insight visualizations are used for presenting insights for another dataset of the user. Various other ways of incorporating the feedback 130 to the insight visualization process for a user can also be used.

In the above examples, one insight visualization is displayed for each insight. The data visualization system 102 can be configured to select and display more than one insight visualization for a given insight. This is useful if there is an insight that is significantly more important than other insights. In this case, showing another different visualization for the insight may be more useful to the user than showing them a different insight and visualization.

Example of a Computing System for Implementing Certain Embodiments

Figure 6:
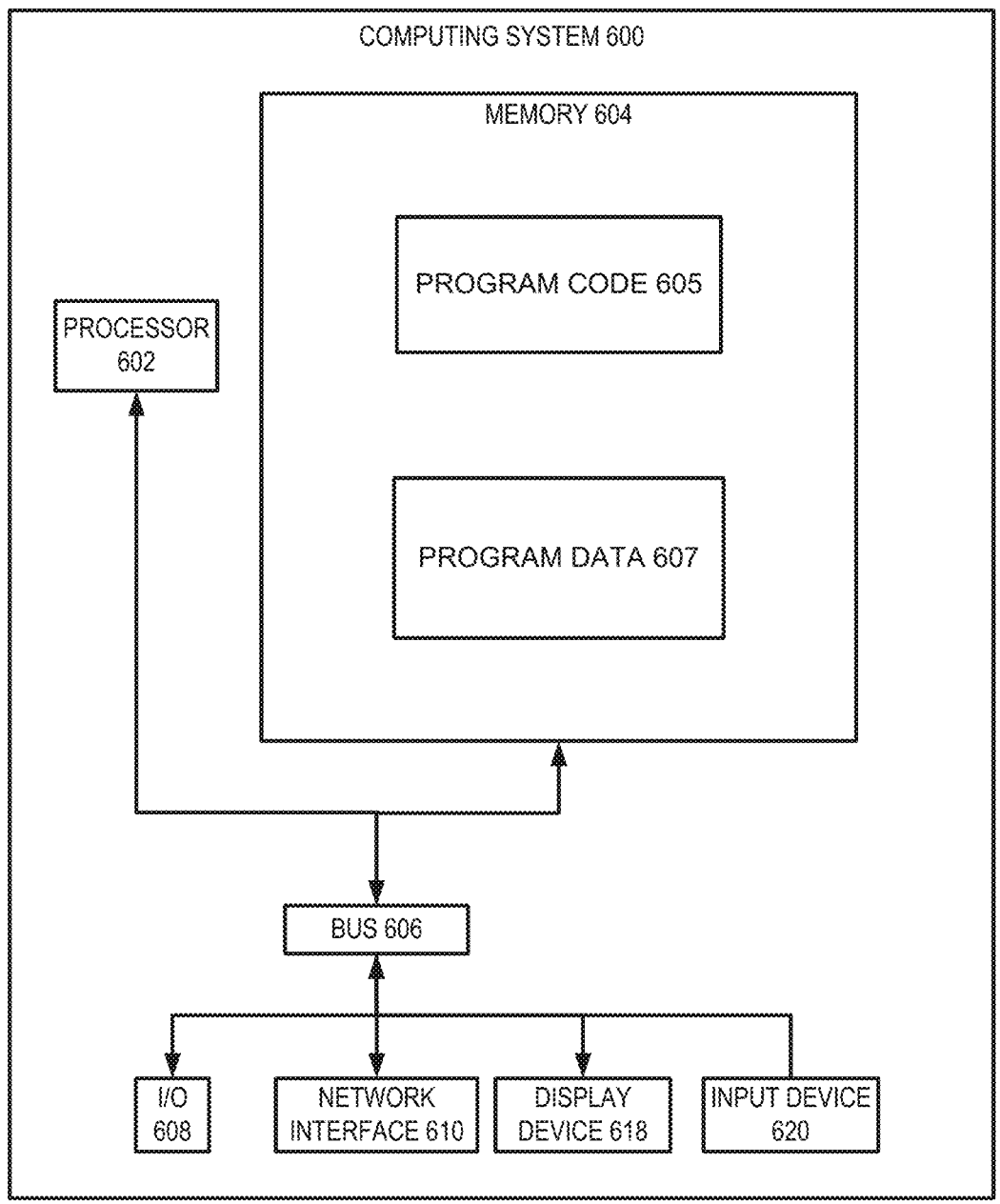
FIG. 6 depicts an example of a computing system for implementing certain aspects of the present disclosure.

Any suitable computing system or group of computing systems can be used for performing the operations described herein. For example, FIG. 6 depicts an example of the computing system 600. The implementation of computing system 600 could be used for one or more of a data visualization system 102 or a client computing system 112. In other embodiments, a single computing system 600 having devices similar to those depicted in FIG. 6 (e.g., a processor, a memory, etc.) combines the one or more operations and data stores depicted as separate systems in FIG. 1.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code 605, program data 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 executes program code 605 that configures the processor 602 to perform one or more of the operations described herein. Examples of the program code 605 include, in various embodiments, the insight visualization module 110 by the data visualization system 102, or other suitable applications that perform one or more operations described herein (e.g., one or more development applications for configuring the client computing system 112). The program code may be resident in the memory device 604 or any suitable computer-readable medium and may be executed by the processor 602 or any other suitable processor.

In some embodiments, one or more memory devices 604 stores program data 607 that includes one or more datasets and models described herein. Examples of these datasets include interaction data, performance data, etc. In some embodiments, one or more of data sets, models, and functions are stored in the same memory device (e.g., one of the memory devices 604). In additional or alternative embodiments, one or more of the programs, data sets, models, and functions described herein are stored in different memory devices 604 accessible via a data network. One or more buses 606 are also included in the computing system 600. The buses 606 communicatively couples one or more components of a respective one of the computing system 600.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices via a data network using the network interface device 610.

The computing system 600 may also include a number of external or internal devices, an input device 620, a presentation device 618, or other input or output devices. For example, the computing system 600 is shown with one or more input/output ("I/O") interfaces 608. An I/O interface 608 can receive input from input devices or provide output to output devices. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, etc. A presentation device 618 can include any device or group of devices suitable for providing visual, auditory, or other suitable sensory output. Non-limiting examples of the presentation device 618 include a touchscreen, a monitor, a speaker, a separate mobile computing device, etc.

Although FIG. 6 depicts the input device 620 and the presentation device 618 as being local to the computing device that executes the data visualization system 102, other implementations are possible. For instance, in some embodiments, one or more of the input device 620 and the presentation device 618 can include a remote client-computing device that communicates with the computing system 600 via the network interface device 610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other types of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which a data visualization system performs operations comprising:
   accessing a dataset comprising data entries;
   detecting insights from the dataset by calculating relationships among variables or the data entries in the dataset, wherein an insight comprises the relationships among variables or the data entries in the dataset, wherein subsets of the detected insights have respective insight types, and wherein an insight type comprises a set of insights having common characteristics in the relationships in the dataset;
   computing insight type scores for the insight types, respectively, based on a user input specifying filtering variables, wherein each insight type score is computed from an aggregation of all insight scores for a respective subset of the detected insights that comprise relationships involving the specified filtering variables, wherein an insight score indicates a relationship strength for the variables or data entries in the dataset;
   determining a selected insight type for the dataset having a higher insight type score as compared to unselected insight types;
   determining, for the selected insight type, a set of selected insights that have higher insight scores as compared to unselected insights that are of the selected insight type and that are excluded from the set of selected insights;
   determining insight visualizations for the set of selected insights, respectively; and
   generating, for inclusion in a user interface of the data visualization system, selectable interface elements configured for invoking an editing tool for updating the determined insight visualizations from the dataset, wherein the selectable interface elements are arranged in the user interface according to the insight scores of the set of selected insights.

2. The computer-implemented method of claim 1, wherein arranging the selectable interface elements in the user interface according to the insight scores of the set of selected insights comprises:
   grouping the selectable interface elements representing the insight visualizations for the set of selected insights into groups according to the insight types of the respective insights, each group corresponding to one insight type;
   ordering the groups according to values of the respective insight type scores of the insight types corresponding to the groups; and
   ordering the selectable interface elements representing the insight visualizations for the set of selected insights within each group according to values of the respective insight scores of the corresponding insights.

3. The computer-implemented method of claim 1, wherein detecting the insights from the dataset comprises:
   detecting each of the insights using one or more insight detection tools, wherein the insight score of each of the insights is calculated by combining scores generated by the corresponding one or more insight detection tools.

4. The computer-implemented method of claim 3, wherein
   each of the data entries in the dataset comprises a plurality of data attributes; and
   an insight having an insight type is detected using an attribute combination comprising a subset of data attributes out of the plurality of data attributes of the data entries, the attribute combination being determined according to the insight type.

5. The computer-implemented method of claim 4, wherein the plurality of data attributes are classified into categorical data attributes and numerical data attributes, and
   the method further comprising selecting the one or more insight detection tools according to the classifications of the subset of data attributes in the corresponding attribute combination.

6. The computer-implemented method of claim 5, wherein determining an insight visualization for an insight in the selected set of insights comprises selecting an insight visualization from a set of candidate insight visualizations according to at least the classifications of the subset of data attributes in the attribute combination corresponding to the insight.

7. The computer-implemented method of claim 1, further comprising:
   receiving feedback from a selectable interface element, the feedback indicating a preference on one or more of the insight visualizations, the insight or the insight type;
   accessing a second dataset;
   generating an insight score for each insight detected from the second dataset according to the preference;
   generating an insight type score for each insight type of the detected insights using the insight scores of the detected insights;
   determining a selected set of insights and a selected set of insight types for the second dataset;
   determining a visualization for each insight of the selected set of insights according to the preference; and
   generating, for inclusion in the user interface of the data visualization system, a second set of selectable interface elements configured for presenting the determined insight visualizations from the second dataset, wherein the second set of selectable interface elements are arranged in the user interface according to the insight scores of the selected set of insights.

8. The computer-implemented method of claim 1, further comprising:
   prior to detecting the insights, aggregating two or more of the data entries to generate aggregated data entries, wherein each of the insights is detected from the aggregated data entries.

9. A data visualization system, comprising:
   a processing device; and
   a non-transitory computer-readable medium communicatively coupled to the processing device, wherein the processing device is configured to execute program code stored in the non-transitory computer-readable medium and thereby perform operations comprising:
      detecting insights from a dataset by calculating relationships among variables or data entries in the dataset, wherein an insight comprises the relationships among variables or data entries in the dataset, wherein subsets of the detected insights have respective insight types, and wherein an insight type comprises a set of insights having common characteristics in the relationships in the dataset;
      computing insight type scores for the insight types, respectively, based on a user input specifying filtering variables, wherein each insight type score is computed from an aggregation of all insight scores for a respective subset of the detected insights that comprise relationships involving the specified filtering variables, wherein an insight score indicates a relationship strength for the variables or data entries in the dataset;
      determining a selected insight type and a set of selected insights for the dataset according to the insight type scores and the insight scores; and
      determining insight visualizations for the selected set of insights, respectively; and
      generating, for inclusion in a user interface of the data visualization system, selectable interface elements configured for presenting the determined insight visualizations from the dataset, wherein the selectable interface elements are arranged in the user interface according to the insight scores of the set of selected insights.

10. The data visualization system of claim 9, wherein arranging the selectable interface elements in the user interface according to the insight scores of the set of selected insights comprises:
    grouping the selectable interface elements representing the insight visualizations for the set of selected insights into groups according to the insight types of the respective insights, each group corresponding to one insight type;
    ordering the groups according to values of the respective insight type scores of the insight types corresponding to the groups; and
    ordering the selectable interface elements representing the insight visualizations for the set of selected insights within each group according to values of the respective insight scores of the corresponding insights.

11. The data visualization system of claim 9, wherein detecting the insights from the dataset comprises:
    detecting each of the insights using one or more insight detection tools, wherein the insight score of each of the insights is calculated by combining scores generated by the corresponding one or more insight detection tools.

12. The data visualization system of claim 11, wherein:
    each of the data entries in the dataset comprises a plurality of data attributes; and
    an insight having an insight type is detected using an attribute combination comprising a subset of data attributes out of the plurality of data attributes of the data entries, the attribute combination being determined according to the insight type.

13. The data visualization system of claim 12, wherein the plurality of data attributes are classified into categorical data attributes and numerical data attributes, and the operations further comprise selecting the one or more insight detection tools according to the classifications of the subset of data attributes in the corresponding attribute combination.

14. The data visualization system of claim 13, wherein determining an insight visualization for an insight in the selected set of insights comprises selecting an insight visualization from a set of candidate insight visualizations according to at least the classifications of the subset of data attributes in the attribute combination corresponding to the insight.

15. The data visualization system of claim 9, wherein the operations further comprise:
receiving feedback from a selectable interface element, the feedback indicating a preference on one or more of the insight visualizations, the insight or the insight type;
accessing a second dataset;
generating an insight score for each insight detected from the second dataset according to the preference;
generating an insight type score for each insight type of the detected insights using the insight scores of the detected insights;
determining a selected set of insights and a selected set of insight types for the second dataset;
determining a visualization for each insight of the selected set of insights according to the preference; and
generating, for inclusion in the user interface of the data visualization system, a second set of selectable interface elements configured for presenting the determined insight visualizations from the second dataset, wherein the second set of selectable interface elements are arranged in the user interface according to the insight scores of the selected set of insights.

16. The data visualization system of claim 9, wherein the operations further comprise:
prior to detecting the insights, aggregating two or more of the data entries to generate aggregated data entries, wherein each of the insights is detected from the aggregated data entries.

17. A non-transitory computer-readable medium having program code that is stored thereon, the program code executable by one or more processing devices for performing operations comprising:
accessing a dataset comprising data entries;
detecting insights from the dataset by calculating relationships among variables or the data entries in the dataset, wherein an insight comprises the relationships among variables or the data entries in the dataset, wherein subsets of the detected insights have respective insight types, and wherein an insight type comprises a set of insights having common characteristics in the relationships in the dataset;
computing insight type scores for the insight types, respectively, based on a user input specifying filtering variables, wherein each insight type score is computed from an aggregation of all insight scores for a respective subset of the detected insights that comprise relationships involving the specified filtering variables, wherein an insight score indicates a relationship strength for the variables or data entries in the dataset;
determining a selected insight type for the dataset having a higher insight type score as compared to unselected insight types;

determining, for the selected insight type, a set of selected insights that have higher insight scores as compared to unselected insights that are of the selected insight type and that are excluded from the set of selected insights;
determining insight visualizations for the set of selected insights, respectively; and
generating, for inclusion in a user interface of a system comprising the one or more processing devices, selectable interface elements configured for invoking an editing tool for updating the determined insight visualizations from the dataset.

18. The non-transitory computer-readable medium of claim 17, the operations further comprising arranging the selectable interface elements in the user interface according to the insight scores of the set of insights.

19. The non-transitory computer-readable medium of claim 18, wherein arranging the selectable interface elements in the user interface comprises:
grouping the selectable interface elements representing the determined insight visualizations for the set of insights into groups according to insight types of the respective insights, each group corresponding to one insight type;
ordering the groups according to values of the respective insight type scores of the insight types corresponding to the groups; and
ordering the selectable interface elements representing the insight visualizations for the set of insights within each group according to values of the respective insight scores of the corresponding insights.

20. The non-transitory computer-readable medium of claim 18, wherein the operations further comprise:
receiving feedback from a selectable interface element, the feedback indicating a preference on one or more of the insight visualizations, the insight or the insight type;
accessing a second dataset;
generating an insight score for each insight detected from the second dataset according to the preference;
generating an insight type score for each insight type of the detected insights using the insight scores of the detected insights;
determining a selected set of insights and a selected set of insight types for the second dataset;
determining a visualization for each insight of the selected set of insights according to the preference; and
generating, for inclusion in the user interface of the system, a second set of selectable interface elements configured for presenting the determined insight visualizations from the second dataset, wherein the second set of selectable interface elements are arranged in the user interface according to the insight scores of the selected set of insights.

* * * * *